United States Patent
Alicherry et al.

(10) Patent No.: US 7,990,846 B2
(45) Date of Patent: Aug. 2, 2011

(54) METHOD AND APPARATUS FOR PROVISIONING A HOP LIMITED PROTECTION PATHWAY IN A NETWORK

(75) Inventors: Mansoor Ali Khan Alicherry, Scotch Plains, NJ (US); Randeep S. Bhatia, Somerset, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1742 days.

(21) Appl. No.: 11/027,905

(22) Filed: Dec. 30, 2004

(65) Prior Publication Data
US 2006/0146733 A1    Jul. 6, 2006

(51) Int. Cl.
*G01R 31/08* (2006.01)
(52) U.S. Cl. .................. 370/216; 370/237
(58) Field of Classification Search .......... None
See application file for complete search history.

(56) References Cited

U.S. PATENT DOCUMENTS

| | | | | |
|---|---|---|---|---|
| 5,251,205 A | * | 10/1993 | Callon et al. | 370/392 |
| 5,600,638 A | * | 2/1997 | Bertin et al. | 370/351 |
| 5,704,036 A | * | 12/1997 | Brownmiller et al. | 714/43 |
| 6,301,244 B1 | | 10/2001 | Huang et al. | |
| 6,324,162 B1 | * | 11/2001 | Chaudhuri | 370/225 |
| 6,349,091 B1 | * | 2/2002 | Li | 370/238 |
| 6,512,611 B1 | * | 1/2003 | Phelps et al. | 398/4 |
| 6,512,740 B1 | * | 1/2003 | Baniewicz et al. | 370/216 |
| 6,856,592 B2 | * | 2/2005 | Grover et al. | 370/216 |
| 7,151,775 B1 | * | 12/2006 | Renwick et al. | 370/400 |
| 7,280,755 B2 | * | 10/2007 | Kang et al. | 398/7 |
| 7,289,531 B2 | * | 10/2007 | Van Den Bosch et al. | 370/466 |
| 2002/0181393 A1 | | 12/2002 | Grover et al. | |
| 2003/0229807 A1 | | 12/2003 | Qiao et al. | |

FOREIGN PATENT DOCUMENTS

| | | |
|---|---|---|
| EP | 1 473 887 A | 11/2004 |
| EP | 05 25 7708 | 3/2006 |
| WO | WO 03/047144 A | 6/2003 |

OTHER PUBLICATIONS

Anand V et al: "Dynamic establishment of protection paths in wdm networks, part I" Computer Communications and Networks, 2000. Proceedings. Ninth International Conference on Las Vegas, NV, USA Oct. 16-18, 2000, Piscataway, NJ, USA, IEEE, US, Oct. 16, 2000, pp. 198-204, XP010524508 ISBN: 0-7803-6494-5.

(Continued)

*Primary Examiner* — Robert W Wilson
(74) *Attorney, Agent, or Firm* — Wall & Tong, LLP (57) ABSTRACT

Method and apparatus for provisioning a protection pathway of a link joining a first point in a network and a second point in the network. The method includes the step of determining a shortest path between the first point and the second point in a protection graph, computing a length of said shortest path, determining if said link should be added to the protection graph according to said computed length and setting the shortest path in the protection graph as protection path for said link. The second step of determining includes evaluating the protection graph to determine if there no existing path or an existing path that is longer than a hop limit. Based on this evaluation, the method either adds the link or makes no change to the protection graph.

15 Claims, 6 Drawing Sheets

OTHER PUBLICATIONS

Bhandari R: "Optimal physical diversity algorithms and survivable networks" Computers and Communications, 1997. Proceedings., Second IEEE Symposium on Alexandria, Egypt Jul. 1-3, 1997, Los Alamitos, CA, USA, IEEE Comput. Soc, US, Jul. 1, 1997, pp. 433-441, XP010241387 ISBN: 0-8186-7852-6.

Garnot M. et al: "Routing strategies for optical paths in WDM networks" Communications, 1997. ICC '97 Montreal, Towards the Knowledge Millennium. 1997 IEEE International Conference on Montreal Que., Canada Jun. 8-12, 1997, p. 422-426, XP010227053 ISBN: 0-7803-3925-8.

Hang Liu et al: "On the tradeoffs between path computation efficiency and information abstraction in optical mesh networks" Communications, 2004 IEEE International Conference on Paris, France Jun. 20-24, 2004, Piscataway, NJ, USA, IEEE, Jun. 20, 2004, pp. 1684-1688, XP010710159 ISBN: 0-7803-8533-0.

Hideki Sakauchi et al., "Review on Reserve Band Assignment Method for Fault Restoration," IEICE, Oct. 27, 1989, vol. 89, No. 262, pp. 13-18.

Junichi Kalau et al., "Proposed Design Method for Logical Topologies That Realize QoP in WDM Networks, Taking Fault Recovery Time into Consideration," IEICE, Feb. 14, 2002, vol. 101, No. 646, pp. 41-46.

* cited by examiner

METHOD AND APPARATUS FOR PROVISIONING A HOP LIMITED PROTECTION PATHWAY IN A NETWORK

FIELD OF THE INVENTION

The present invention relates to a method and apparatus for provisioning a network, and more particularly, for determining the amount of bandwidth that is required to protect a link between two network locations.

DESCRIPTION OF THE BACKGROUND ART

Service providers are finding it increasingly cost effective to consolidate voice and video applications into a single packet based network. The success of this consolidation hinges on the ability to provide the requisite Quality of Service (QoS) guarantees to individual applications in place of networks that have traditionally been used to carry such types of traffic. For real time applications, this translates into strict bandwidth, end to end delay, jitter and loss rate guarantees. For example, applications such as Voice over IP (VoIP) and video conferencing require the largest possible bandwidth while keeping the end to end delay, jitter, and packet loss rates at a minimum. Lower end to end delay results in a more satisfactory, natural-feeling conferencing experience; conversely, large delay values result in unnatural conversations with long pauses between phrases or sentences. Large jitter values (delay variability) may result in jerky video or stuttering, popping audio. It may also result in packet getting dropped for exceeding its delay budget. Packet losses exceeding the tolerable limit further results in poor voice and video quality due to clipping and skipping. In today's "best effort" data networks, the router and switch buffers tend to fill up rapidly resulting in delays and packet losses. In addition to these delays, delay jitter and loss probability values for the packets accumulate with each hop traversed in the network.

In a differentiated services framework, these effects are mitigated by marking packets belonging to real-time sessions to receive preferential forwarding treatment, or per-hop behavior, at each network node. However, even when some kind of priority queuing and scheduling (e.g. as in Diffserv) is used for real time traffic, QoS requirements are dependent on key parameters. Such parameters include the number of network hops on which such traffic is routed. It is known that, even when priority queuing is used for voice traffic, the queuing delays can become significantly large even for 5-hop length paths, due to transmission delays of non-voice packets on small bandwidth links (sub-10 Mbps links).

Minimizing the number of hops of the paths used for routing data traffic is important in other contexts, such as minimizing signal quality deterioration in optical networks. As signals travel over multiple hops they become weaker and may need to be regenerated if the number of hops become too large. This may entail costly Optical-Electrical-Optical (OEO) converts. Additionally, in MPLS and optical networks, fast restoration can be achieved by locally routing around failures using pre-setup detour paths. For example the MPLS fast restoration mechanism, referred to as fast or local reroute supports a local repair capability. Upon a node or link failure, the first node upstream from the failure reroutes the effected Label Switch Paths (LSP) onto bypass (backup) tunnels, with equivalent guaranteed bandwidths, to bypass the failure point. The number of hops in the new path for the LSP is thus directly related to the length of original path and the length of the bypass tunnels for the failed links or nodes. The number of hops in the rerouted path can easily become large for poorly designed networks. Thus effective restoration schemes are needed that not only guarantee quick restoration from failures but also guarantee that there is no significant increase in the hop counts of the rerouted paths.

SUMMARY OF THE INVENTION

Various deficiencies of the prior art are addressed by the present invention of a method for provisioning a protection pathway of a link joining a first point in a network and a second point in the network. The method includes the steps of determining a shortest path between the first point and the second point in a protection graph, computing a length of said shortest path, determining if the link should be added to the protection graph according to said computed length and setting the shortest path in the protection graph as protection path for said link.

For scenarios having multiple detour paths to create the protection pathways; the method also includes the step of dividing the link joining the first point and the second point into plurality of parallel sublinks to create a plurality of subnetworks prior to computing the shortest path between the first point and the second point. Such sublinks are sorted according to link capacity and a ratio representing the total capacities of the links previously considered to the total working capacity previously considered during the provisioning process.

Additionally, the invention includes an apparatus for performing an operation of provisioning a protection pathway of a link joining a first point in a network and a second point in the network including means for determining a shortest path between the first point and the second point in a protection graph, means for computing a length of the shortest path, means for determining if the link should be added to a protection graph and means for setting the shortest path in the protection graph as protection path for said link.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
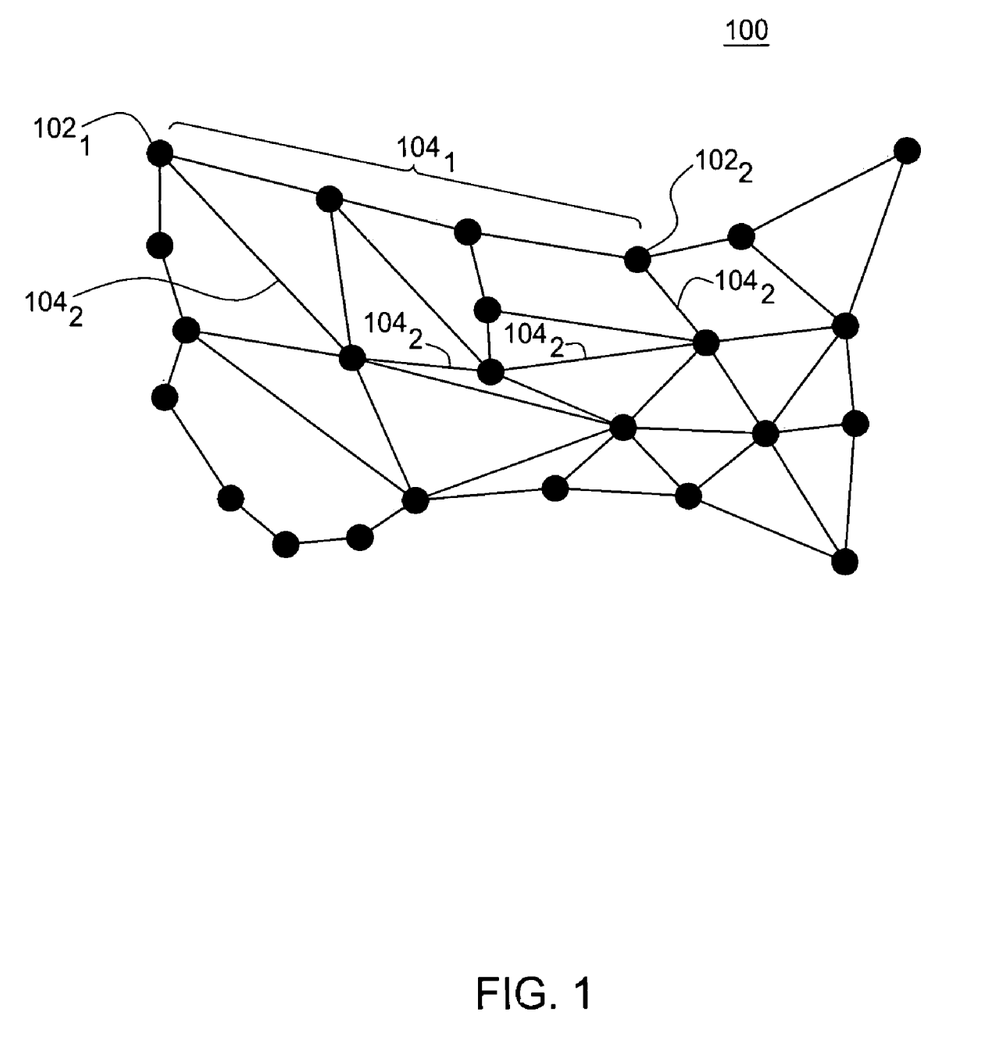
FIG. 1 depicts a representation of an exemplary network analyzed in accordance with the methods of the subject invention.

FIG. 1 depicts an exemplary data network 100 upon which the subject invention operates and exists. The data network 100 includes (among other things) a plurality of nodes 102$n$ interconnected by a plurality of links 104$m$. As can be seen, there can be more than one defined pathway (defined by one or more links 104$_1$ and 104$_2$), to transfer data from a starting node 102$_1$ to an end node 102$_2$. However, such a data network 100 is prone to link and router failures (e.g. underbuffering, general failure and the like) which has a detrimental effect on the quality of the supported voice and video applications. Such failures may be compounded if data sessions are rerouted on longer paths, which may not only affect the delay jitter during the reroute but may also adversely impact the end to end delays and delay jitter subsequent to the reroute. The subject invention provides a method and apparatus for ensuring that hop lengths are limited when a network failure occurs to support real time traffic in these networks.

More specifically, the exemplary network 100 is analyzed to determine the amount of protection capacity that is required so that user specified limits on the hop counts for a bypass tunnel are guaranteed for all possible link failures. Although the design problem is presented in the context of the fast or local reroute mechanism for MPLS and optical networks, the solution can be applied to other types of networks. Such networks make efficient use of protection capacity by sharing it among bypass tunnels used for protecting different links. Pre-partitioning models (in which protection capacities and bypass tunnels are pre-reserved so as to reduce much of the complexity and signaling overheads of the dynamic schemes) are presented which have the additional benefit of being computationally fast and independent of future traffic demands and result in an apriori partition of the network capacity into working and protection capacity on a link by link basis. As a result, online routing of QoS guaranteed traffic in the network is greatly simplified in that any data session can be optimally routed (e.g. over paths of minimum hop lengths) in an unprotected manner, completely oblivious to restoration considerations, on the working capacity portion of the network. In the event of failure, sufficient protection capacity is determined and pre-computed bypass tunnels are available to carry the rerouted traffic. When not in use, the reserved protection capacity may be used to carry lower priority non-real time traffic which may be pre-empted by real time traffic.

In further analysis; consider network 100 as a capacitated network G=(V;E) where V is the set of n nodes and E the set of m links. The links are capacitated: link e∈E has capacity u(e). For ease of presentation, assume that the network 100 is undirected, there are no parallel links, and link capacities are integral. A hop constraint r≧2 is imposed for the length of the bypass tunnels and a split-factor k≧1. The problem is to partition the capacity u(e) of each link e∈E into a working capacity w(e)≦u(e) and a protection capacity p(e)=u(e)−w(e) to guarantee link restoration (against a single link failure), using only the protection capacities of the links, and using only at most k bypass tunnels (for bypassing the failed link) each of length at most r hops, with the goal of minimizing the total amount of bandwidth used for protection ($\Sigma_e p(e)$). Additionally, assume that the protection capacity can be shared between bypass tunnels associated with different links.

Let B(e) denote the set of bypass tunnels for link e. A feasible solution to the presented problem satisfies the following conditions:

1) On the failure of link e its maximum service traffic, which is w(e)=u(e)−p(e), can be rerouted off link e using only the protection capacity reserved on the links of its bypass tunnels B(e). The path of this traffic includes the set of |B(e)| paths obtained by concatenating its original path without link e with each of the bypass tunnels in B(e). Thus the traffic continues to use the working capacities of the links on its original path (except link e) and uses protection capacities of links in B(e).

2) |B(e)|≦k for all links e and each bypass tunnel in B(e) is no more than r hops long.

3) The total protection capacity $\Sigma_e p(e)$ is minimized.

One method (a first method) of the subject invention provides a fast approximation algorithm for the problem of minimizing the total amount of pre-provisioned protection capacity, and for computing the set of pre-installed bypass tunnels, to ensure that the network is fully link protected with limited hop length. More specifically, a t-spanner G' (or protection graph) of a larger graph G is a subgraph of G in which length of a shortest path between any pair of nodes is at most t times the length of the shortest path in G. The algorithm finds an r-spanner graph G' and assigns full protection capacities to the links of G'. All the remaining links have full working capacity. The algorithm guarantees that all the links with positive working capacity have a protection path of at most r hops.

In the following, it is assumed that the distance metric is hop count for a link e=(u,v) where u is a start node $102_1$ and v is a terminating node $102_2$. The function P(u, v) denotes the shortest path from u to v, and the function length (P(u, v)) denotes the number of links in P(u, v). If there is no path between u and v, length (P(u, v)) is ∞. In one embodiment of the invention, this first method is identified and further described as MAXHOP and is described as follows:

```
Input: Graph G = (V,E) and r – maximum number of
       hops in protection path.
Let {e1, e2,....em} be the links sorted in non-
       increasing order of link capacities (u(e)).
G'=ø
for i = 1,....m {
    Suppose e_i = (u, v).
    Compute P(u,v), the shortest path from u to v in G'.
    if(length(P(u,v)) > r) {
        G'=G' ∪ {e_i}
        p(e_i)=u(e_i), w(e_i) = 0
    } else {
        p(e_i) = 0, w(e_i) = u(e_i)
    }
}
return G'
```

Note that the approximation ratio for the algorithm depends on the maximum hop length a bypass tunnel can take. The greater the allowable hop length, the greater the efficiency of the algorithm.

Figure 2:
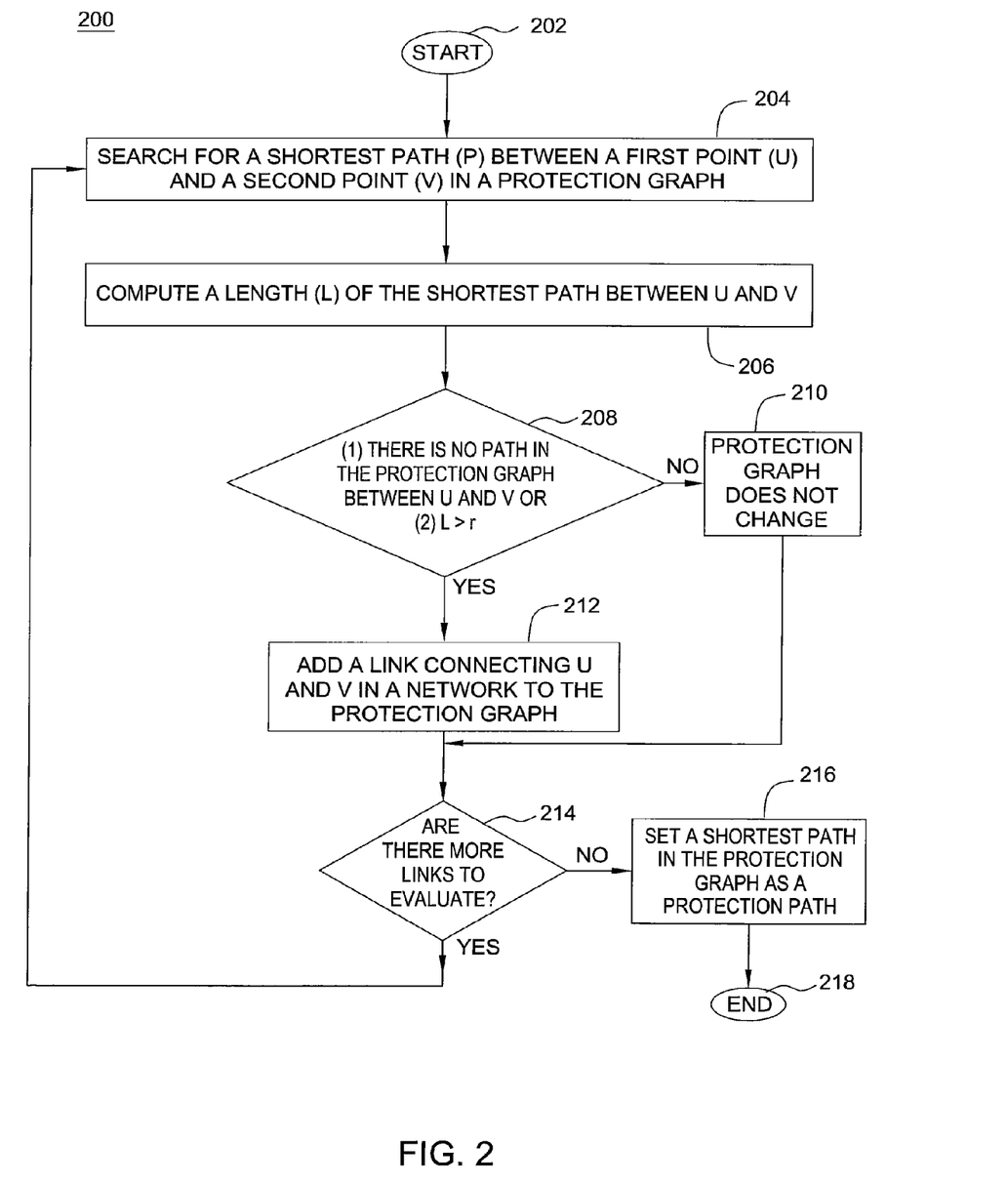
FIG. 2 depicts a first method for provisioning a network in accordance with the subject invention.

FIG. 2 depicts the first method (MAXHOP) for calculating protection pathways as a series of steps 200. Specifically, the method starts at step 202 and proceeds to step 204 where links in the network are sorted in order of non-increasing capacity and a shortest path P is searched in a protection graph. A link n is defined by first point u and second point v. Once the shortest path between the first and second points has been searched, the method moves to step 206 where a length L of this shortest path P between first point u and second point v is computed. Once this length computation is completed, the method moves to step 208 to make a decision. Specifically, the question is asked as to whether (1) there is no path in the protection graph between the first point and the second point or (2) the shortest path in the protection graph that is longer than length r (a hop limit) for the identified link n. If there is no path in the protection graph, or the shortest path is longer than the hop limit r, the link n is added to the protection graph at step 212. If the answer to step 208 is no, then the method moves to step 210 where no change to the protection graph is made.

Once the decision is made to as to whether or not to add the link n to the protection graph (either at steps 210 or 212), the method moves to step 214 where a decision is made as to whether there are more links n to evaluate. If there are more links to evaluate, the method loops back to step 204 to search a new shortest path P for a new link n. If there are no more links to evaluate, the method moves to step 216 where the shortest path in the protection graph is set or dedicated as the protection pathway for a given link.

Algorithm MAXHOP does not allow the rerouted service traffic to be split on multiple detour paths. It allocates either all or none of the link capacity for protection. Accordingly, a second algorithm is provided that allows for reserving a portion of the links available capacity for protection and that allows at most k detour paths per link for a user specified parameter k. Essentially, the second algorithm splits the network into k sub-networks and runs the first algorithm on each individual network. Combining the outputs for each run results in up to k protection paths per link. The network splitting involves replacing (splitting) each link by multiple parallel links of smaller capacities.

More specifically, let $U=\max_{e \in E} u(e)/k$. Each link is split into multiple links of capacity U, except at most one link of capacity less than U, so that their total capacities add up to $u(e)$. For example, if for link $e_i$ there is $(s-1)U < u(e_i) \leq sU$ then $e_i$ is split into s links $e_{i1}, e_{i2}, \ldots, e_{is}$. The capacities of the first s-1 links is U and link $e_{is}$ has capacity $u(ei)-(s-1)U$. As such, k sub-networks are created. Sub-network j contains all links $e_i$ with $u(e_i) \geq (j-1)U$. More specifically, for such a link $e_i$, link $e_{ij}$ is added to sub-network j. The second algorithm iterates over all the sub-networks, from sub-network k to sub-network 1. Let $p'(e_i)$ be the total amount of protection assigned to links $e_{i1}, e_{i2}, \ldots$ considered by the algorithm so far. Likewise let $u'(e_i)$ be the total capacities of the links among $e_{i1}, e_{i2}, \ldots$ that are considered so far. Then, define $w'(e_i)=u'(e_i)-p'(e_i)$ and define protect(e; e') to be the amount of protection capacity reserved on link e' to protect link e when e fails.

In one embodiment of the invention, this second method is identified and further described as MAXHOP-SPLIT and is described as follows:

---

Input. Graph G = (V,E), k—number of protection paths bound, and r—protection path hop bound.
Let $\{e_1, e_2, \ldots, e_m\}$ be the links, split the links into $e_{ij}$.
Set $p'(e_i)$; $u'(e_i)$, for all links $e_i$, to 0.
Set protect(e, e'), for all pairs of links (e, e'), to 0.
For j = k downto 1{
  1) Sort all the links $e_{ij}$ in Network j in decreasing order with $u(e_{ij})$ as a primary key, and $\dfrac{u(e_{ij}) + w'(e_i)}{u(e_{ij}) + u'(e_i)}$ as a secondary key.

2) Let $E(e_i)$ be the set of links e' of such that $p'(e') - \text{protect}(e_i, e') \geq u(e_{ij})$
  3) Let $G(e_i) = (V, E(e_i))$
  4) Run MAXHOP on Network j, but with path computation P(u, v) for link $e_{ij} = (u, v)$ done making use of links in $G(e_i)$
  5) For all $e_{ij} = (u, v) \in$ Network j {
    $u'(e_i) = u'(e_i) + u(e_{ij})$
    $p'(e_i) = p'(e_i) + p(e_{ij})$ (i.e. protection capacity assigned by MAXHOP)
    For all links e' in P(u, v) protect($e_i$, e') = protect($e_i$, e') + $u(e_{ij})$
  }
}

For all $e_i \in E$
$p(e_i) = p'(e_i)$

---

This second algorithm sorts the links with the same capacity in decreasing order of $(u(e_{ij})+w'(e_i))/(u(e_{ij})+u'(e_i))$. This is a ratio of the working capacity to the total capacity so far, if it is assumed that full working capacity is put in this iteration. The algorithm prefers to add protection capacity to links with higher values of this working capacity ratio in order to share and load balance the allocation of protection capacities among the links. Otherwise, MAXHOP-SPLIT would consider links (their split links) in the same order across all iterations defeating the purpose of balancing the allocation of protection capacities across all links.

Note that MAXHOP-SPLIT runs MAXHOP on each sub-network with certain optimization for reusing the protection bandwidth of previous iterations. It can be shown that the algorithm is correct without these optimizations. The optimization step merely uses the protection capacity of link e' of previous steps, only if the link $e_i$ under consideration has not used them in the previous steps (i.e $p'(e')-\text{protect}(e_i; e') \geq u(e_{ij})$). Hence the algorithm returns a feasible solution even with the optimization.

For this algorithm the bypass tunnels for each link $e_i=(u, v)$ is the union of all paths P(u, v) where when considering link $e_{ij}$, MAXHOP finds a path P(u, v) of r hops that can be used to protect link $e_{ij}$ in Network j. Note that there are at most k such P(u, v) per link $e_i$, since MAXHOP is only run up to k times for each $e_{ij}$.

Figure 3A:
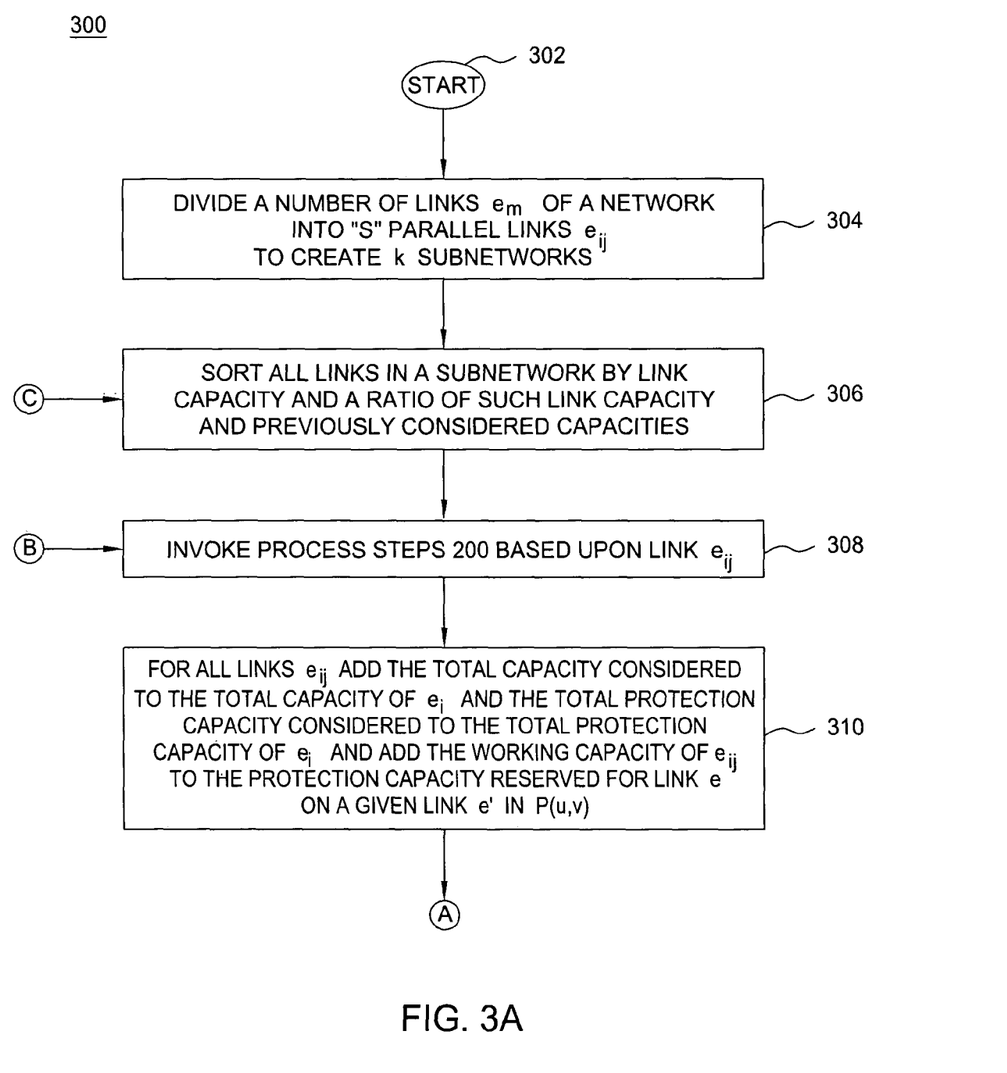
FIG. 3 depicts a second embodiment of a method for provisioning a network in accordance with the subject invention.
Figure 3B:
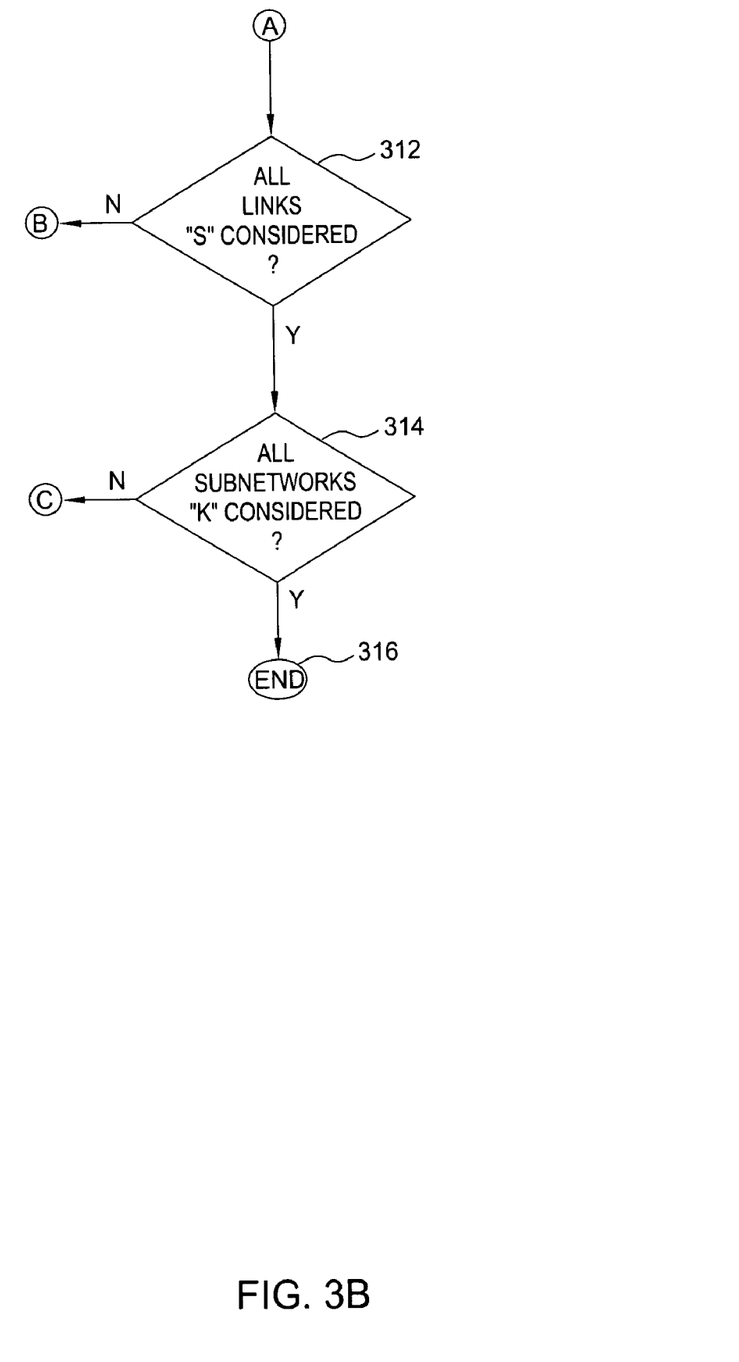

FIG. 3 depicts the second method (MAXHOP-SPLIT) for calculating protection link pathways and utilization as a series of steps 300. Specifically, the method starts at step 302 and proceeds to step 304 where a number of links $e_m$ in a network are divided into s parallel links $e_{ij}$ to create K sub-networks. The method then proceeds to step 306 where all of the links $e_{ij}$ in a given subnetwork are sorted according to link capacity and a ratio of such link capacity and previously considered capacities as described above. Specifically, and in one embodiment of the invention, the sorting is done in order of decreasing capacity and the ratio is the working capacity to the total capacity already considered.

Once all the links $e_{ij}$ have been sorted, the method proceeds to step 308 where the process MAXHOP as identified as method step 200 in FIG. 2 is invoked and a protection capacity value is determined for each of the parallel links $e_{ij}$. Once all the values for the parallel links are determined (via the invocation of method 200, method 300 proceeds to step 310 to perform a final calculation of the protection capacity. Specifically, for all links $e_{ij}$ the total capacity considered is added to the total capacity of $e_i$, and the total protection capacity considered is added to total protection capacity of $e_i$. Additionally, the working capacity of $e_{ij}$ is added to the amount of protection capacity reserved for link e on a given link e' in P(u,v).

Once the additions are performed, the method moves to step 312 where a first query is posed to determine if all of the links in the subnetwork have been considered. If not, the method 300 loops back to step 308 to process another link according to the steps of method 200 described above. If all links in the subnetwork have been considered, the method proceeds to step 314 where a second query is posed to determine if all of the sub-networks "k" have been considered. If not, the method loops back to step 306 to sort links in a new sub-network. If all sub-networks "k" have been considered, the method ends at step 316.

To measure the performance of the algorithms, simulations using various networks, including some standard networks such as ARPANET, NJ LATA, National and the European Cost239 networks were conducted. The algorithms were run on these networks, both with uniform link capacities u(e)=1 and with randomly chosen non-uniform link capacities u(e) in the range of 1 to 2. The protection paths are limited to 3, 4, and 5 hops. As a benchmark, the solution obtained for mixed integer linear programming (ILP) and linear programming (LP) formulations of the problem was used. Note that, since the LP models the problem with fewer constraints, its optimal solution is a lower bound on the optimal solution to the problem. The ILP models the NP-complete problem exactly, therefore it may take too long to return the optimal solution.

Observations are summarized in Table I. "Total" is the total link capacity for the non-uniform case, "ILP Max" is the best feasible ILP solution obtained, "ILP Min" is the corresponding relaxed LP from the ILP returned, 2-MAXHOP is MAX-HOP-SPLIT with k=2. In 2-MAXHOP, "Prot" is the total protection capacity and PBN % (Protection percentage of Backup Network) measures how effective 2-MAXHOP is in using only partial link capacities for protection and is a percentage of the protection capacity relative to the total link capacity of the links with non-zero protection capacity.

hop constraint. The solution is to put half protection on most links, and full protection on a few links. Full protection on some links is needed because there is no path of size at most r in the network.

Moreover, from column "PBN %" in Table I, 2-MAXHOP does not reserve more than 84% of the link capacity among links with non-zero protection capacity as the backup pool. Often the value is around 60%, while using MAXHOP the percentage is always 100%. Note that the ratio cannot be smaller than 50% when k is 2. This shows that the 2-MAXHOP scheme is very successful at sharing and balancing the protection capacities among the links.

TABLE I

RESULTS FROM REAL LIFE NETWORKS

| Network | # of Node | # of Link | r | Uniform | | | | | |
|---|---|---|---|---|---|---|---|---|---|
| | | | | LP | ILP Min | ILP Max | MAX HOP | 2-MAXHOP Prot | PBN % |
| ARPANET | 20 | 32 | 3 | 20.0 | 20.0 | 20.0 | 26.0 | 20.0 | 63 |
| | | | 4 | 15.2 | 15.2 | 20.0 | 24.0 | 17.0 | 53 |
| | | | 5 | 12.8 | 12.8 | 19.0 | 24.0 | 16.0 | 50 |
| NJ LATA | 11 | 23 | 3 | 7.3 | 7.3 | 10.0 | 13.0 | 10.0 | 50 |
| | | | 4 | 6.4 | 6.7 | 11.0 | 12.0 | 9.5 | 50 |
| | | | 5 | 6.3 | 6.9 | 10.0 | 12.0 | 9.5 | 50 |
| National | 24 | 44 | 3 | 19.9 | 19.9 | 25.5 | 31.0 | 24.5 | 56 |
| | | | 4 | 17.6 | 17.6 | 26.0 | 28.0 | 23.5 | 50 |
| | | | 5 | 14.0 | 14.0 | 25.0 | 26.0 | 20.5 | 50 |
| Cost 239 | 11 | 26 | 3 | 6.7 | 6.7 | 14.0 | 15.0 | 12.0 | 50 |
| | | | 4 | 5.5 | 5.5 | 13.5 | 11.0 | 10.0 | 50 |
| | | | 5 | 5.5 | 5.5 | 10.0 | 11.0 | 10.0 | 50 |

| Network | # of Node | # of Link | r | Total | Non-Uniform | | | | | |
|---|---|---|---|---|---|---|---|---|---|---|
| | | | | | LP | ILP Min | ILP Max | MAX HOP | 2-MAXHOP Prot | PBN % |
| ARPANET | 20 | 32 | 3 | 45.7 | 23.5 | 23.6 | 29.1 | 35.2 | 25.7 | 61 |
| | | | 4 | | 23.6 | 23.6 | 29.1 | 35.2 | 25.7 | 61 |
| | | | 5 | | 19.5 | 19.5 | 27.0 | 32.9 | 22.5 | 53 |
| NJ LATA | 11 | 23 | 3 | 30.5 | 10.6 | 10.6 | 16.2 | 16.7 | 13.1 | 53 |
| | | | 4 | | 9.7 | 9.7 | 15.5 | 16.7 | 13.1 | 59 |
| | | | 5 | | 9.6 | 9.8 | 16.3 | 16.7 | 12.2 | 57 |
| National | 24 | 44 | 3 | 66.2 | 31.5 | 41.0 | 46.4 | 44.9 | 83 | 31.5 |
| | | | 4 | | 28.2 | 43.5 | 45.4 | 39.4 | 82 | 28.2 |
| | | | 5 | | 23.1 | 42.4 | 42.9 | 35.3 | 65 | 23.1 |
| Cost 239 | 11 | 26 | 3 | 35.5 | 10.0 | 10.0 | 20.9 | 21.2 | 16.4 | 64 |
| | | | 4 | | 9.3 | 9.3 | 20.4 | 17.6 | 11.9 | 55 |
| | | | 5 | | 9.3 | 9.3 | 20.6 | 17.6 | 11.0 | 50 |

LP assigns 37% of the total link capacity as protection capacity on the average. The performance of 2-MAXHOP is thus close to optimal since it assigns 49% of the total link capacity as protection capacity on the average. (at most 1.37 times the LP on average) It excels in particular when the network is dense and r is large. MAXHOP assigns 62% of the total link capacity as protection capacity on the average. The value is higher because only one protection path is allowed. (at most 1.74 times the LP on average). Note that NJ LATA, National, and the European Cost239 networks are denser than the ARPANET network. For these dense networks and for r=5, 2-MAXHOP only reserves 42% of the total link capacity, and MAXHOP reserves around 54% of the total link capacity for protection. In sparser networks like ARPANET, 2-MAXHOP performs close to the LP optimal solution.

Figure 4:
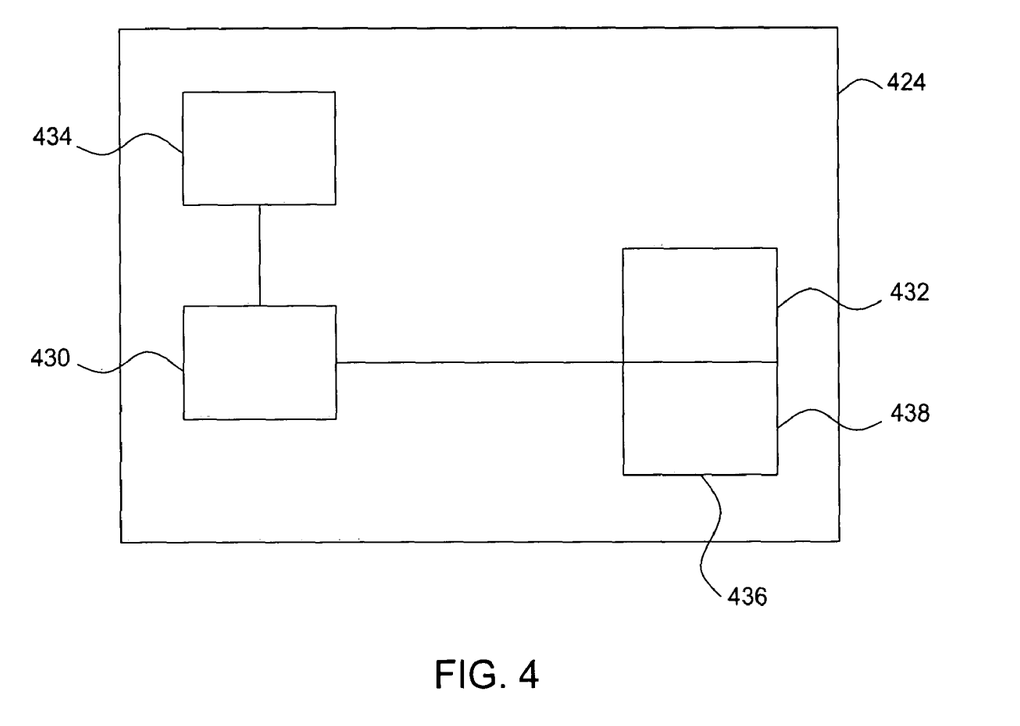
FIG. 4 depicts an apparatus for practicing the methods of FIGS. 2 and/or 3 in accordance with the subject invention.

For ARPANET, r=3 and uniform capacities, IP returns the optimal solution, and it is the same as what is returned by the LP OPT. It is because since ARPANET network is fairly sparse, there is only one protection path that can satisfy the FIG. 4 details the internal circuitry of exemplary hardware that is used to execute the above-identified methods 200 and 300 of FIGS. 2 and 3 respectively in the manner described to calculate the appropriate path length and cost to arrive at an appropriate protection capacity value as discussed above. The hardware is contained within control module 424 as a computer or other type of processing device inside network 100 or an external computing device having the necessary programming information (i.e., pseudo code of the above-identified figures) to remotely run the necessary algorithms. Specifically, the computing device 424 comprises at least one central processing unit (CPU) 430, support circuits 434, and memory 436. The CPU 430 may comprise one or more conventionally available microprocessors. The support circuits 434 are well known circuits that comprise power supplies, clocks, input/output interface circuitry and the like. Memory 436 may comprise random access memory, read only memory, removable disk memory, flash memory, and various combinations of these types of memory. The memory 436 is sometimes referred to as main memory and may in part be used as cache memory or buffer memory. The memory 436 stores various software packages (i.e., packages 432 and 438) that dictate the steps required to process and analyze nodes and paths in accordance with the first or second algorithms described above thus forming a special purpose machine for doing same when running said software packages or a corresponding ASIC.

It is known that it is very difficult to create a spanner of a minimum number of links for the case of t≧2. Accordingly, the above identified methods were developed to determine an approximate solution. An optimal solution is also available based upon mixed Integer Linear Program (ILP) for the case k=1. A Linear Program for optimally solving the problem (in polynomial time) when k is unbounded is also presented. The main purpose is to demonstrate that it is possible to formulate efficient, polynomially sized LPs for the presented problem. These LPs are also used in simulations for measuring the performance of the approximation algorithms.

Generally speaking in terms of these alternate solutions, an undirected graph is transformed into a directed graph by replacing each link with two directed links going in opposite direction. The notation pair(e) is used to denote the link in the opposite direction of link e. It is assumed that both the directed links fail together and $\delta in(v)$ and $\delta out(v)$ are used to denote the incoming and outgoing links for node v.

ILP Based Approach

In the ILP formulation, all the integer variables are binary variables. These types of ILPs are easier to solve than general ILPs. The binary variable use(e,e') is used to capture the protection path in the network, when the link e fails. use(e,e') is set to 1 if the protection path uses link e', on the failure of link e. The ILP is $$\text{Minimize} \sum_{e \in E} (p(e)/2) \quad (1)$$

Note that since the protection capacity of each (undirected) edge is counted twice, once for each direction, the total protection capacity is divided by 2 in the objective function. The constraints are For all e∈E; v∈V $$\sum_{i \in \delta in(v)} \text{use}(e, i) - \sum_{i \in \delta out(v)} \text{use}(e, i) = 0 \quad (2)$$

The above constraint is the "flow conservation" constraint at each node (including the end points of e). Since the binary variable use is an indicator for protection path, the constraint states that if a protection path enters a node, then it should also leave the node. For a link e, if use(e, pair(e)) is set to 1, then the flow conservation constraint would guarantee exactly one protection path for e. The following does that for links whose working capacity (u(e)−p(e)) is non-zero.

For all e∈E $$u(e) \cdot \text{use}(e, \text{pair}(e)) \geq u(e) - p(e) \quad (3)$$

The reason for using the above, rather than directly setting use(e,pair(e)) to 1, will be clear later. The following constraint ensures that the protection path for a link does not use itself.

For all e∈E $$\text{use}(e,e)=0 \quad (4)$$

The following guarantees that the length of protection path is at most r.

For all e∈E $$\sum_{i \in E} \text{use}(e, i) \leq r + 1 \quad (5)$$

Since use(e, pair(e)) is set to 1, the length of the protection path will be $$\sum_{i \in E} \text{use}(e, i) - 1.$$

Hence r+1 is used, rather than r, in the inequality.

The following constraint guarantees that, if a link e uses a link i in its protection path, then the protection capacity of link i exceeds the working capacity of e (i.e. u(e)−p(e)).

For all e; i∈E; i≠pair(e)

$$p(i)+(1-\text{use}(e,i))u(e) \geq u(e)-p(e) \quad (6)$$

For all e∈E $$p(e) \leq u(e) \quad (7)$$

$$p(e)=p(\text{pair}(e)) \quad (8)$$

$$p(e) \geq 0 \quad (9)$$

Constraint (7) guarantees that protection capacity does not exceed the total capacity. Constraint (8) is for guaranteeing a solution for the undirected graph. Constraint (9) guarantees that the protection capacities are non-negative.

Equation 3 is used, rather than direct assignment, to set the values of use(e,pair(e)) to 1. If a direct assignment is used, constraint (5) along with flow conservation constraints, would require graph to have a protection path (even if it is of 0 capacity) of length≦r for all the links. Instead, by using equation 3, full protection capacity is assigned on links whose smallest cycle is more than r+1.

Unbounded Splitting

In this section, backup flows are split arbitrarily (k is unbounded). There is still a constraint on number of hops the protection paths can take. It is shown that the problem can be solved optimally in polynomial time.

Figure 5:
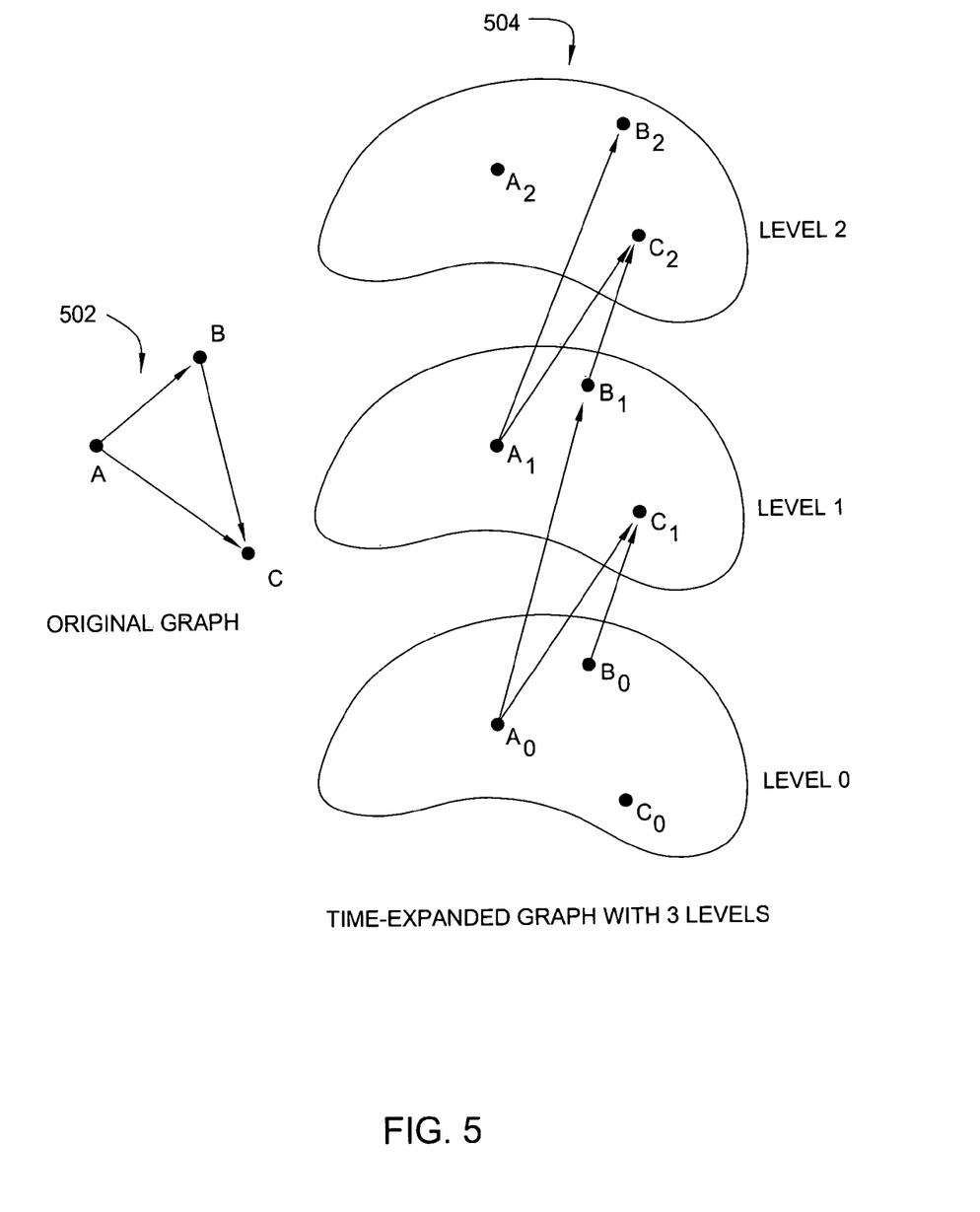
FIG. 5 depicts an original and time-expanded graph in accordance with one embodiment of the invention.

Time-expanded graph: The notion of time-expanded graphs was introduced in "Constructing Maximal Dynamic flows from Static flows", Ford and Fulkerson, Operations Research 6:419-433, 1958. A time expanded graph contains a copy of nodes at each discrete "time intervals" (levels). A time-expanded graph of r+1 levels is constructed for the purposes of the subject invention. Levels are numbered from 0 to r. Let the node u in level i be represented as $u_i$. If there is an edge (u,v) in the original graph, then the time-expanded graph contains edges from $u_{i-1}$ to $v_i$; for i=1 . . . r. FIG. 5 depicts the original graph 502 and a time-expanded graph of 3 levels 504. An undirected graph is converted to a directed graph by replacing an edge with two directed edges, before constructing the time-expanded graph.

Lemma: The maximum length of any path in a time-expanded graph of level r+1 is r.

Proof: The edges in a time-expanded graph only go from one level to next level. Therefore, there is no cycle in the graph and the longest path goes from lowest level to the highest.

A linear program (LP) on the time-expanded graph of r+1 levels is formulated and the above lemma is used to restrict the protection path length to r. Note that the time-expanded graph is not explicitly constructed; they are used for understanding the LP conceptually.

The variable flow(e,e',i) is used for i=1 . . . r to denote the amount of flow rerouted on link e' going from level i−1 to level i, on failure of the link e. Total flow rerouted on link e' on the failure of link e is $$\sum_{i=1...r} \text{flow}(e, e', i).$$

As in the ILP, the objective function is, $$\text{Minimize} \sum_{e \in E} (p(e)/2) \tag{10}$$

Backup flow for a link e=(x,y) is routed in the time-expanded graph as follows: a flow of u(e)−p(e) is sent at the node x0 and the same among the nodes $y_1 \ldots y_r+1$ is received. The flow is not permitted to leave at any of the $y_l$, l=0 . . . r nodes. Flow conservation constraints in all other nodes are:
For all e=(x,y) ∈E; l=1 . . . r $$\text{flow}(e,e,l)=0 \tag{11}$$

$$\text{flow}(e,\text{pair}(e),l)=0 \tag{12}$$

The above constraints ensures that backup flow for a link does not use itself or its reverse link.
For all e=(x,y)∈E $$\sum_{e' \in \delta out(x), e' \neq e} \text{flow}(e, e', 1) = u(e) - p(e) \tag{13}$$

The above constraint sends a flow of w(e)=u(e)−p(e), for a link e=(x,y), among the outgoing links of x (except the link e) in level 0.
For all e=(x,y)∈E, v∈V, v≠x, v≠y, l=2 . . . r $$\sum_{e' \in \delta in(v)} \text{flow}(e, e', l-1) = \sum_{e' \in \delta out(v)} \text{flow}(e, e', l) \tag{14}$$

The above constraint is the flow conservation constraint for the protection path of link e=(x,y) on all the nodes, except x and y, on levels 1 to r−1. It states that if the backup flow enters the node at level l, it should also leave the node. This does not take care of the nodes in level 0. Backup flow is not wanted for link e=(x,y) to enter from any nodes in level 0 except x0. The following constraint ensures that.
For all e=(x,y)∈E, v∈V, v≠x $$\sum_{e' \in \delta out(v)} \text{flow}(e, e', l) = 0 \tag{15}$$

A separate constraint is not needed for nodes at level r as all the flow is collected at the destination. For a link e=(x,y), the following constraint collects all the backup flow among the node y in all the level. (To be precise it will be among the levels 2 to r+1.)

For all e=(x,y)∈E $$\sum_{l=2} \sum_{e' \in \delta in(y)} \text{flow}(e, e', l) = u(e) - p(e) \tag{16}$$

Since a link e' is split into multiple links (levels), the following constraint guarantees that backup flow, on failure of link e, among all these levels is less than the protection bandwidth of e'.
For all e=(x,y)∈E, e'∈E $$\sum_{l=1...r} \text{flow}(e, e', l) \leq p(e') \tag{17}$$

Like ILP, the following constraints guarantees that protection capacity does not exceed the total capacity (constraint 18), the solution works for the undirected graph (constraint 19), and protection capacities are nonnegative (constraint 20).
For all e∈E $$p(e) \leq u(e) \tag{18}$$

$$p(e)=p(\text{pair}(e)) \tag{19}$$

$$p(e) \geq 0 \tag{20}$$

Although various embodiments which incorporate the teachings of the present invention have been shown and described in detail herein, those skilled in the art can readily devise many other varied embodiments that still incorporate these teachings.

We claim:

1. A non-transitory computer readable medium, wherein computer instructions, when processed by a computer, adapt the operation of the computer to perform the steps for provisioning hop-limited protection paths in a network having a plurality of nodes interconnected by a plurality of links, comprising:
dividing each of the plurality of links into a plurality of parallel sublinks to create a plurality of subnetworks, wherein each of the plurality of subnetworks includes the plurality of nodes interconnected by a plurality of subnetwork links, wherein of the plurality of subnetwork links comprises one or more of a respective plurality of parallel sublinks;
sorting sublinks in a subnetwork of the plurality of subnetworks;
wherein the sublinks are sorted according to the ratio:

$$\frac{u(e_{ij}) + w'(e_i)}{u(e_{ij}) + u'(e_i)}$$

where:
$e_i$ represents a link,
$e_{ij}$ represents a sublink of the link $e_i$,
u represents total link capacity,
u' represents total capacities of the links previously considered, and
w' represents total working capacity previously considered.

2. The non-transitory computer readable medium of claim 1, wherein the computing spanner comprises:
for each subnetwork:

determining a shortest path in the spanner within the subnetwork between a first point and the a second point, wherein the first point and the second point define a subnetwork link;
computing a length of the shortest path; and
evaluating the computed length to determine whether the subnetwork link should be added to the spanner.

3. The non-transitory computer readable medium of claim 2, wherein the sublinks are sorted according to link capacity.

4. A non-transitory computer readable medium containing a program which, when executed, performs the steps of provisioning a hop-limited protection paths in a network having a plurality of nodes interconnected by a plurality of links, comprising:
dividing each of the plurality of links into a plurality of parallel sublinks to create a plurality of subnetworks;
sorting the sublinks of each subnetwork;
determining a shortest path in a protection graph between a first point and a second point, wherein the first point and the second point are joined by a link of the network;
computing a length of the shortest path between the first point and the second point in the protection graph; and
evaluating the computed length of the shortest path by comparing the computed length with a hop limit to determine whether the link should be added to the protection graph;
wherein the link is added to the protection graph if there is no path between the first point and the second point in the protection graph or the computed length is longer than the hop limit.

5. The computer readable medium of claim 4, wherein the shortest path in the protection graph is set as a protection path for the link if the computed length is shorter than or the same as the hop limit.

6. The computer readable medium of claim 4, wherein the sublinks of each subnetwork are sorted according to the ratio:

$$\frac{u(e_{ij}) + w'(e_i)}{u(e_{ij}) + u'(e_i)}$$

where:
$e_i$ represents a link,
$e_{ij}$ represents a sublink of the link $e_i$,
u represents total link capacity,
u' represents total capacities of the links previously considered and
w' represents total working capacity previously considered.

7. An apparatus for provisioning a protection path of a link joining a first point in a network and a second point in the network, the apparatus comprising:
means for dividing each of the plurality of links into a plurality of parallel sublinks to create a plurality of subnetworks;
means for sorting the sublinks of each subnetwork;
means for determining a shortest path between the first point and the second point in a protection graph;
means for computing a length of the shortest path;
means for evaluating the length of the shortest path to determine whether the link should be added to the protection graph; and
means for setting the shortest path in the protection graph as the protection path for the link;
means for dividing links of the network into a plurality of parallel sublinks to create a plurality of subnetworks.

8. The apparatus of claim 7, wherein the means for evaluating further comprise:
means for determining if a path between the first point and the second point in the protection graph exists, or if the computed length is longer than the hop limit.

9. The apparatus of claim 7, wherein the sublinks are sorted according to the ratio:

$$\frac{u(e_{ij}) + w'(e_i)}{u(e_{ij}) + u'(e_i)}$$

where:
$e_i$ represents a link,
$e_{ij}$ represents a sublink of the link $e_i$,
u represents total link capacity,
u' represents total capacities of the links previously considered, and
w' represents total working capacity previously considered.

10. A non-transitory computer readable medium, wherein computer instructions, when processed by a computer, adapt the operation of the computer to perform the steps for provisioning a hop-limited protection path in a network having a plurality of nodes interconnected by a plurality of links, comprising:
dividing a number of links in the network into a plurality of parallel links to define thereby a plurality of subnetworks;
sorting the sublinks of each subnetwork;
for each subnetwork, determining a shortest path between first and second points in a protection graph associated with the subnetwork by evaluating each of the plurality of parallel links forming the subnetwork and updating the protection graph associated with the subnetwork in response to the shortest path length information; and
adapting the hop-limited protection path according to the protection graph of the shortest hop subnetwork exhibiting sufficient capacity.

11. The non-transitory computer readable medium of claim 10, further comprising:
computing a length of the shortest path between the first point and the second point in the protection graph; and
evaluating the computed length of the shortest path to determine whether the link should be added to the protection graph.

12. The non-transitory computer readable medium of claim 10, further comprising sorting each link in each subnetwork according to the link capacity, said determining being a shortest path for each subnetwork performed according to a capacity sorted link order.

13. The non-transitory computer readable medium of claim 10, wherein the evaluating comprises: comparing the computed length of the shortest path with a hop limit.

14. The non-transitory computer readable medium of claim 13, wherein the link is added to the protection graph if there is no path between the first point and the second point in the protection graph or the computed length is longer than the hop limit.

15. The non-transitory computer readable medium of claim 13, wherein if the computed length is shorter than or the same as the hop limit, the shortest path in the protection graph is set as a protection path for the link.

* * * * *